Oct. 22, 1963

J. A. MAURER

APPARATUS FOR OPTICALLY RECORDING A SOUND RECORD AREA ON A STRIP OF FILM 3,108,160

Filed Feb. 16, 1959

7 Sheets-Sheet 1

INVENTOR.

JOHN A. MAURER

BY Hane and Nydick

ATTORNEYS

Oct. 22, 1963 J. A. MAURER 3,108,160

APPARATUS FOR OPTICALLY RECORDING A SOUND RECORD AREA ON A STRIP OF FILM

Filed Feb. 16, 1959 7 Sheets-Sheet 2

INVENTOR.

JOHN A. MAURER

BY Haue and Nydick

ATTORNEYS

INVENTOR.
JOHN A. MAURER
BY Hane and Nydick
ATTORNEYS

INVENTOR.
JOHN A. MAURER
BY Hane and Nydick
ATTORNEYS

INVENTOR.
JOHN A. MAURER
BY Hane and Nydick
ATTORNEYS

INVENTOR.
JOHN A. MAURER
BY Herne and Nydick
ATTORNEYS

INVENTOR.
JOHN A. MAURER
BY Hane and Nydick
ATTORNEYS

3,108,160
APPARATUS FOR OPTICALLY RECORDING A SOUND RECORD AREA ON A STRIP OF FILM

John A. Maurer, 116 W. 29th St., New York, N.Y.
Filed Feb. 16, 1959, Ser. No. 793,329
5 Claims. (Cl. 179—100.3)

The present invention relates to strip film bearing one or several programs or presentations, each program comprising a picture area and a sound record area longitudinally spaced on film, and more particularly to the sound record area of such program. The invention further relates to apparatus for recording sound record lines on the film section assigned to the sound record area of the program.

Broadly speaking, the object of the present invention resides in providing an array of discontinuous record lines from which sound can be reproduced in a continuous manner and with satisfactory fidelity by means of a scanning system while the sound record area is held stationary in reference to the scanning system, and resides further in providing apparatus capable of recording record lines on film from which continuous sound reproduction as defined above can be obtained and of effecting such recording in an economically practical manner.

Other and further objects, features and advantages of the invention will be pointed out hereinafter and set forth in the appended claims forming part of the application.

In the accompanying drawing, several preferred embodiments of the invention are shown by way of illustration and not by way of limitation.

Figures 1, 2:
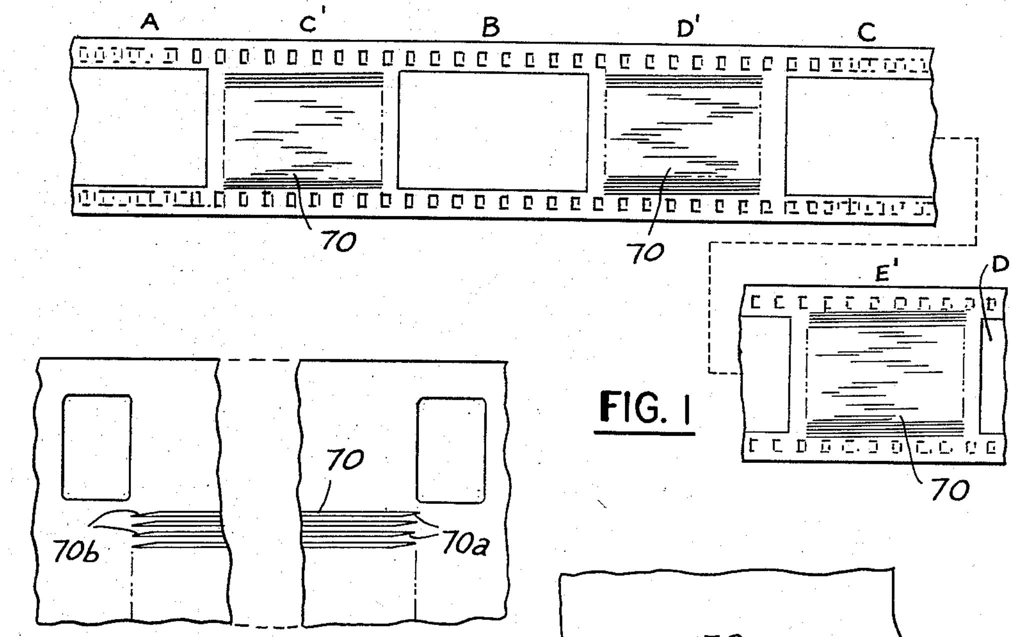
FIG. 1 shows a section of a strip film bearing the picture areas and the associated sound areas of several programs.
FIG. 2 shows one of the sound record areas more in detail and on an enlarged scale.
Figure 3:
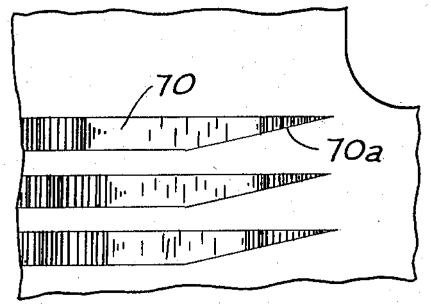
FIG. 3 shows an end portion of a single record line on a further enlarged scale.
Figure 8A:
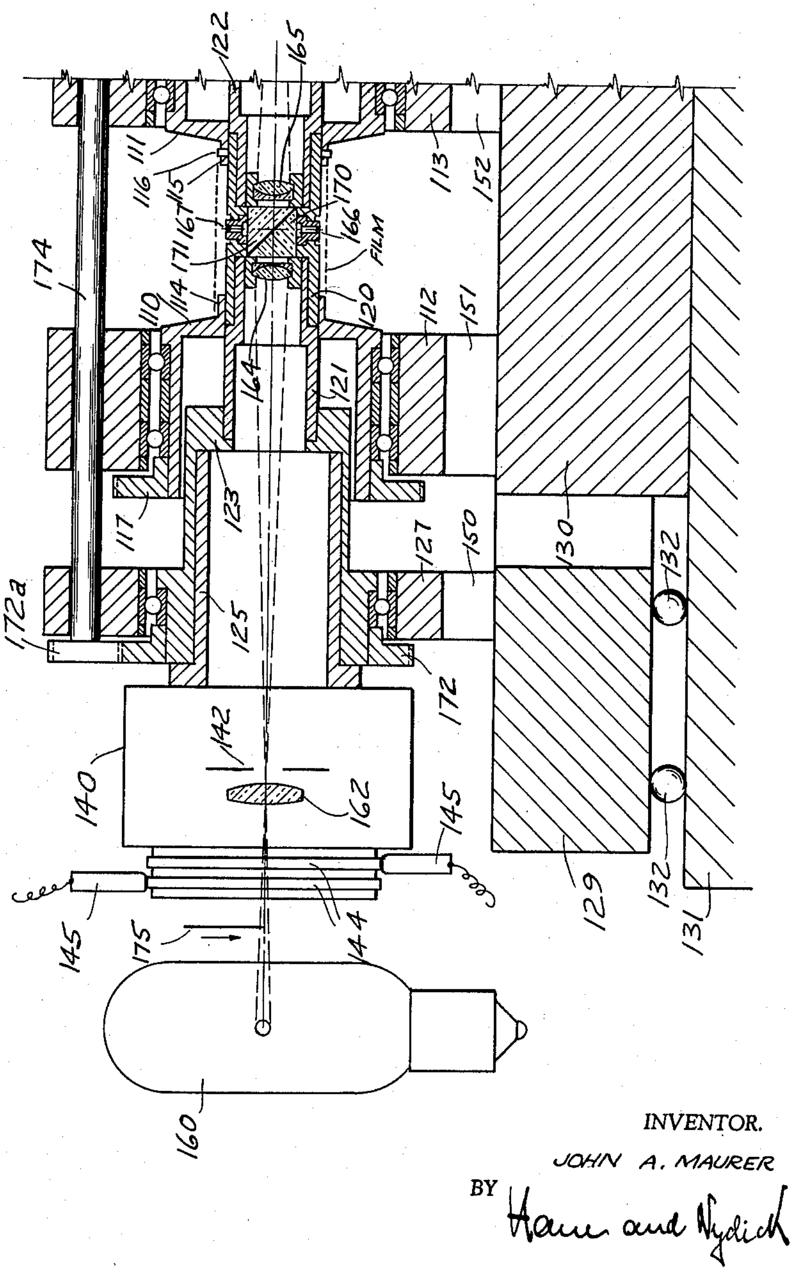
Figure 8B:
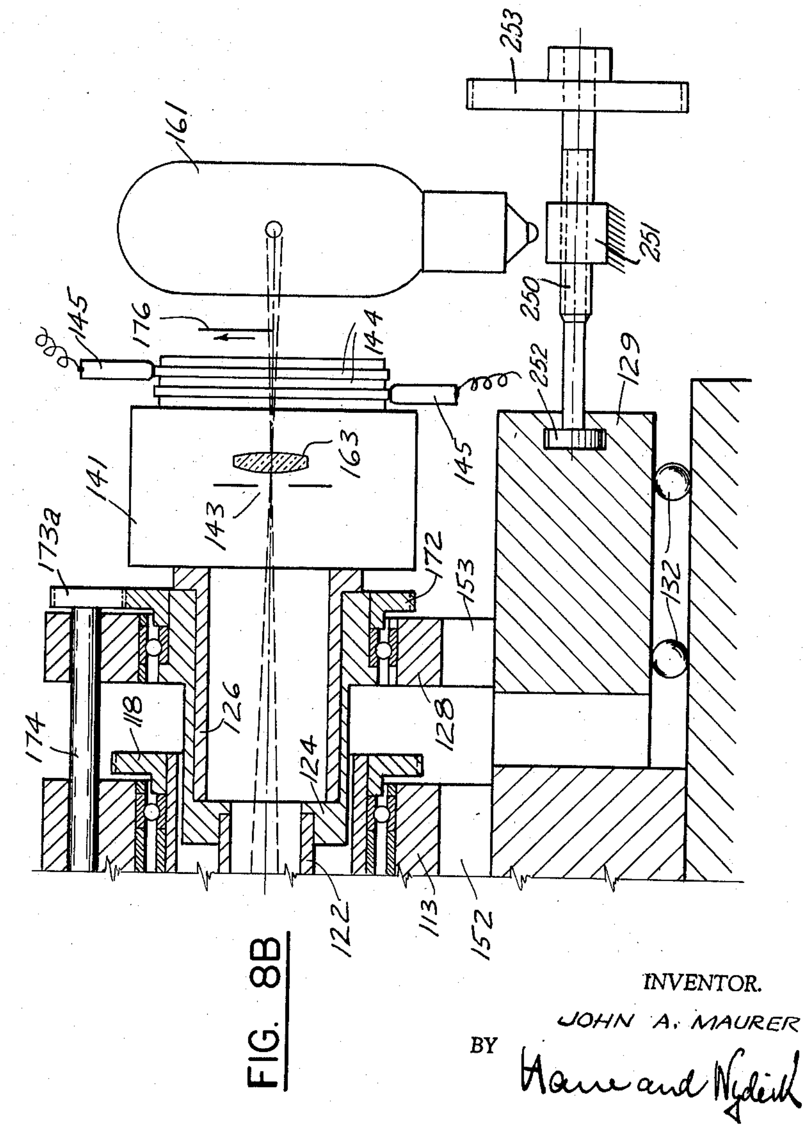

FIGS. 8A and 8B in conjunction show a sectional elevational view of a modification of the apparatus for recording the sound record lines of FIGS. 1 to 3.

Figures 9A, 9B, 9C:
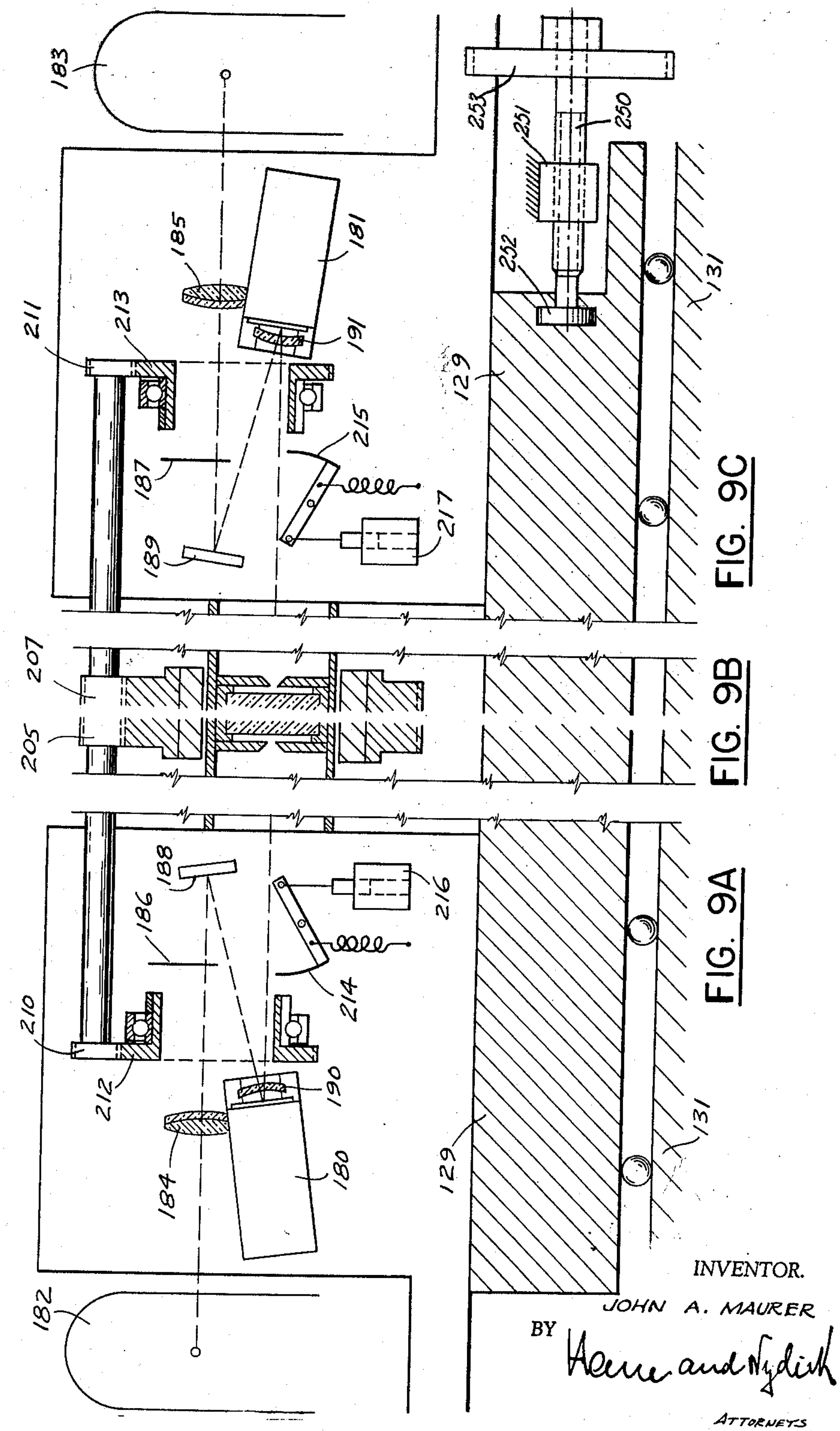
Figure 9B:
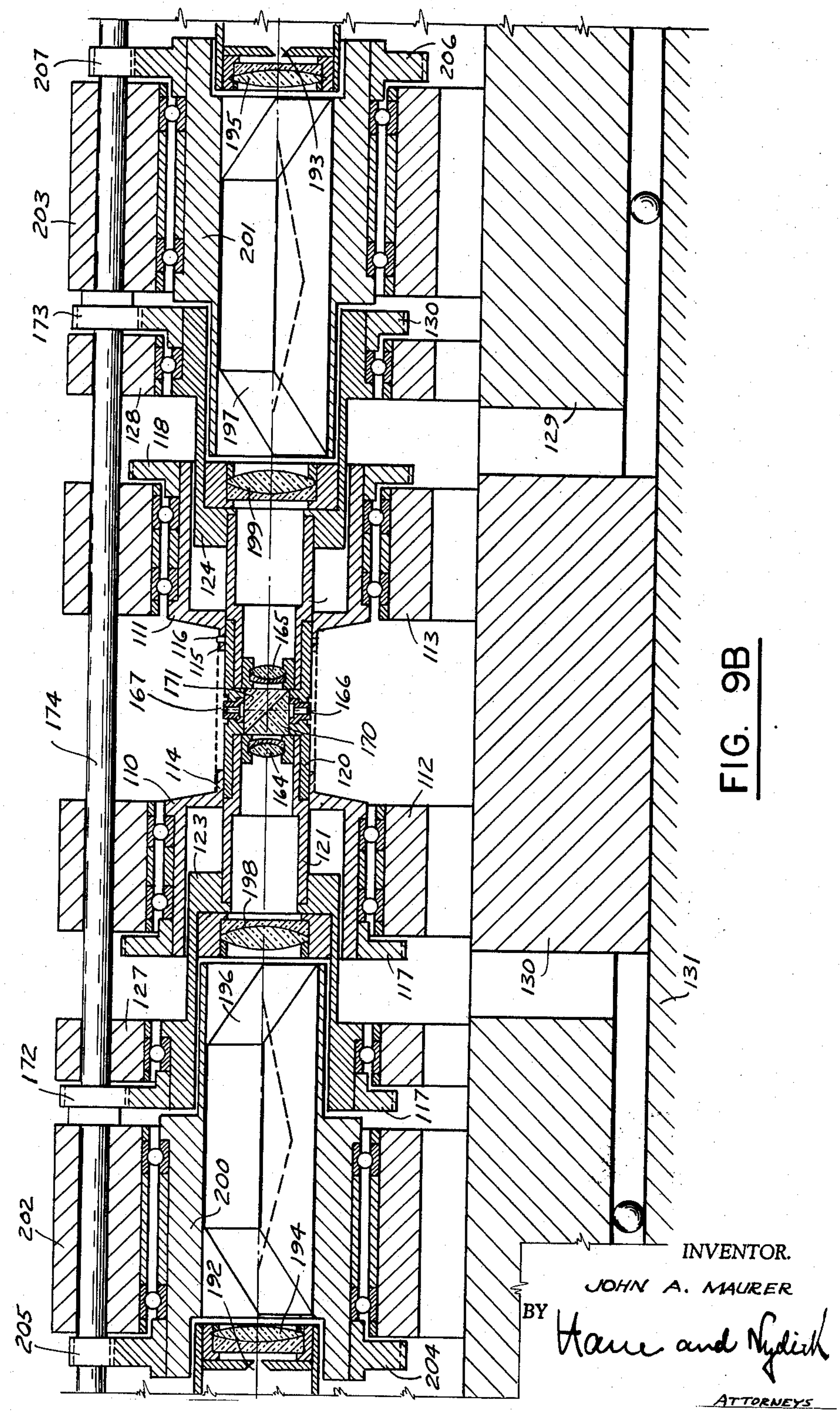

FIGS. 9A, 9B and 9C in conjunction show a sectional elevational view of saill another modification of the apparatus for recording the sound record lines of FIGS. 1 to 3.

Referring first to FIGS. 1, 2 and 3 in detail, the strip of film shown in FIG. 1 carries picture areas A, B, C, and D which are separated from each other by sound record areas C′, D′, E′, etc. The sound record areas are on the strip of film in advance of the associated picture areas with reference to the direction in which the film is intended to be fed through a sound projector. While the picture areas and the sound areas alternate on the film, the associated areas are not necessarily disposed directly adjacent to each other. For instance, between picture area C and the corresponding sound record area C′, a sound area D′, and a picture area B are interposed.

The picture area D associated with the sound area D′, is partly shown, but the sound area associated with picture area B would be to the left of the figure.

As is apparent, each sound area includes a plurality of individual discontinuous sound record lines 70. The sound record lines are parallel to each other, but inclined in reference to either longitudinal edge of the strip of film. While in theory any number of parallel record lines may be provided, in practice the number of lines is determined by the total width of the film, the width of the individual lines and the required spacing between each two lines. The lines should be visualized as constituting part of a helix when a sound record area is brought into a circular configuration.

In order to effect the aforementioned continuous reproduction of sound from the discontinuous lines, each line has at its ends a fade-out section and a fade-in section respectively. These sections are shown as wedge shaped fade-out sections **70*a* and fade-in sections 70*b*. As is clearly shown in FIG. 2, the slanted lines of the two wedge sections 70*a* and 70*b*** of each line face in opposite directions at the two ends of each line.

Assuming now that scanning for reproduction is effected by scanning successive lines, starting with the lowermost line and progressing toward the uppermost line, it will be observed that scanning of the fade-out section **70*a* of a line will be immediately followed in the sequence of scanning by the fade-in section 70*b*** of the next upper line. Consequently, if the scanning operation is so correlated that the scanning of the fade-out section and the next following fade-in section overlap, a continuous reproduction of sound is obtained. In other words, when the sound record areas shown in FIG. 1 are brought into a cylindrical shape, the record lines thereon constitute a continuous helical sound thread of equal width from which continuous sound can be reproduced.

The basic problem of putting down on film, in the form of the aforesaid array of discontinuous lines, may be broken down into the following set of requirements:

(1) The lines recorded on the film must be equally spaced.

(2) There should preferably be a slight overlap of the part of the sound record that is near the end of each line and the part that is at the beginning of the next line.

(3) There should preferably be a form of blend, or fade-out of one record line and fade-in of the next, over the parts which are overlapped, so that in reproduction a continuous level of output may be obtained while the transition from one line to the next is taking place. This blend may consist of ta variation of the width of the lines, or it may consist in a change of density going from normal density to black.

(4) The linear distance on the film from the record of a given detail of the sound waves near the end of one line to the duplicate record of the same detail near the beginning of the next line (within the overlapped portion) must be exactly the same for all pairs of lines in the record. (This is the distance between each scanning light beam and the next in the reproducer, which must be maintained with high accuracy.)

(5) The record lines must be equally exposed and equally modulated, so that there are no erratic changes in the volume of the sound.

Further requirements are introduced by the need for compressing the record into a comparatively small space. In order to obtain adequate frequency range and volume range in a small space, it is necessary to (1) Produce an exceptionally narrow recording line of light, say, no wider than .0001 inch.

(2) Maintain substantially perfect focus of this line of light on the surface of the film used for recording. In practice this means that errors of focus should not exceed about .00025 inch.

(3) Produce a recording line of light that is bright enough to record on film that is very fine in its grain structure and therefore relatively insensitive to light. Such films give less background noise than more sensitive, coaser grained films.

Speaking, then, in general terms, in order to make records of the kind here involved that are good enough to be of commercial value, the following elements should be provided:

(1) Means of supporting the film in a definite position while one of its frames is being recorded on, and of moving it from one frame to the next.

(2) A light modulator or a plurality of light modulators.

(3) Optical means of causing the modulated light to form a succession of equally spaced very fine line images which can be focused accurately on the surface of the film.

(4) Means of moving these line images at constant velocity across the record area of the film.

(5) Means of producing a continuous displacement between the film and the path of the moving lines of light, at right angles to their direction of motion, so that the record is laid down in the form of a series of narrow, equally spaced lines.

(6) Means of gradually cutting off the light in each recording image as it nears the end of its path and at the same time gradually, and at an equal rate, admitting light to the optical parts which form the next line image which is just beginning to traverse its path.

From a practical standpoint a few more general observations may be made.

(1) While it is conceivable that a mechanism might be created which would record on the film while it is held flat or in some other non-cylindrical shape, much the best arrangement is that which holds the film in the form of a right circular cylinder with the sensitive surface on the concave side, while the optical parts which form the fine recording lines of light are mounted on a support which rotates about the axis of the cylinder. This arrangement is particularly advantageouss because it makes it easy to keep the lines of light in accurate focus on the sensitive surface of the film.

(2) In order to obtain the necessary exceptionally fine imagery of the recording lines of light, it is highly advantageous and, in fact, almost essential, to make those lens elements which bring the light to its final focus of short focal length and locate them physically near the film surface. This means that there must be a plurality of these lens elements (not fewer than two) and that they must be equally spaced and travel near the film surface at almost the same velocity as the images they form.

(3) Since it is essential that all the lines of the record be exposed equally, it is desirable that the optical systems all derive their light from one light source or at most from two, which can be adjusted to produce equal exposure. With more than two light sources, it would become very difficult to maintain uniform exposure of the record lines.

(4) Similarly, it is desirable to use not more than two light modulators, so that it is not too difficult to maintain a constant level of modulation.

In the light of all the above considerations, it may be seen that practicable devices for making the type of record here involved may be of two classes:

A. Devices in which the light from a single source is modulated by a single light modulator and this light is then optically made to follow a succession of objective lenses mounted on a rotating drum. These objective lenses act one at a time to bring the light to a focus in the form of a fine line on the film surface, except that when the transfer is being made from one line to the next there is a short interval during which two lenses are receiving light.

B. Devices in which two light sources and two modulators supply light to two objective lenses which act alternately, the light being cut off from one and admitted to the other by shutters when one line of the record is ending and the next line beginning.

In devices of either class A or class B, the light modulator may be a "light valve" (as made originally by Western Electric) or a mirror galvanometer, or a Kerr cell, or a supersonic light modulator of the type recently described in the Journal of the Society of Motion Picture and Television Engineers. The record lines may be of either the variable area or the variable density type.

Figures 4, 5:
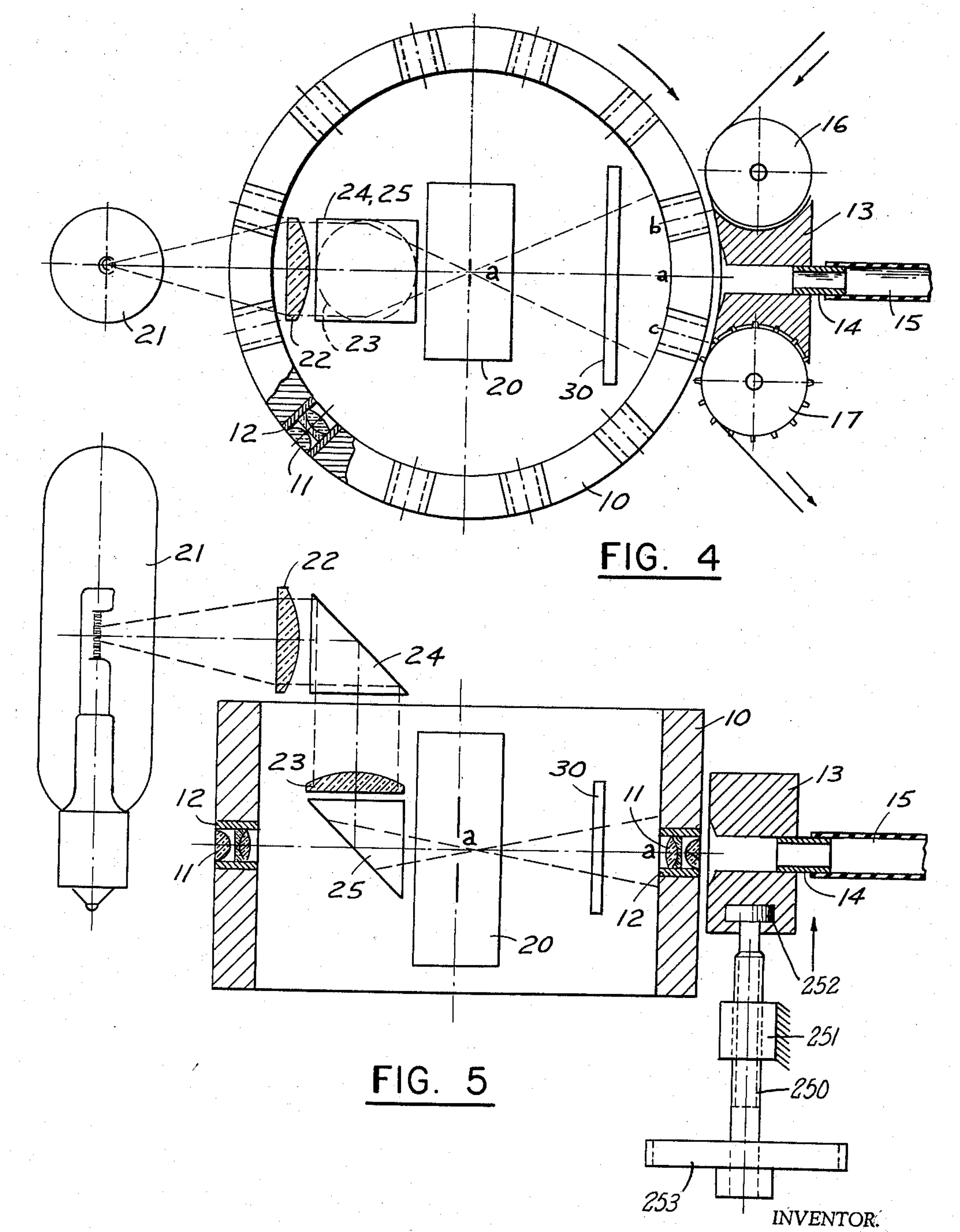
FIG. 4 is a cross-sectional view of an apparatus according to the invention for recording the record lines of a sound record area as shown in FIGS. 1 to 3.
FIG. 5 is a side view, partly in section, of the apparatus according to FIG. 4.

FIGS. 4 and 5 show a rotating ring or turret 10 carrying twelve well corrected spherical lenses 11—11, each consisting of three lens elements. Each of these lenses 11 is mounted in a sleeve 12 which is threaded to facilitate accurate focusing. The film is carried over a concave cylindrical guide 13, to which it is held by a vacuum applied through a coupling 14 and a rubber hose 15. The surface of the guide 13 has in it a network of very fine slots which communicate with each other and with the vacuum line so that the vacuum is applied over substantially the entire area of the guide and therefore the film is held firmly in contact with it.

A roller 16 and a sprocket 17 provide for leading the film to the guide 13 and for advancing it after a frame has been recorded. Guides (not shown) control the lateral position of the film as it is fed to the guide 13. The vacuum may be reduced when film is being advanced, but some vacuum must be maintained at all times to keep the sensitive side of the film from rubbing on the turret 10.

The axis of the cylindrical surface of guide 13 coincides with the axis of rotation of turret 10.

The turret 10 is mounted to rotate on an axis, and is driven, in the direction indicated, through an accurate drive system including a heavy flywheel to insure steadiness of the rotary motion.

The guide 13 is mounted on a slide so that it can move parallel to the axis of turret 10. A lead screw driven by gearing from the drive system of turret 10 moves guide 13 in the direction indicated in the drawing at such a rate that the lines recorded by the passages of the successive lenses 11 in turret 10 are spaced apart 12½/1000 of an inch, or 80 to the inch.

The lenses 11 and their mounting sleeves 12 are retained in holes threaded in turret 10. These holes must be indexed very accurately, so that the spaces between all the pairs of adjacent lenses are equal.

The light modulator is a light valve 20, of standard construction. The construction of light valves as made by Westrex Corporation (formerly a subsidiary of Western Electric) is well known. Accordingly, only the length and width of the aperture between the two ribbons of the valve are indicated. The plane of the light valve ribbons is at right angles to the line *a—a* leading from the aperture between the ribbons to the center of guide 13. Thus the lenses 11 as they pass from side *b* to side *c* of guide 13 are in the most favorable position to form images of the light valve aperture on the concave emulsion surface of the film which is held in position on guide 13 by the vacuum.

Light from the lamp 21 is brought to the light valve aperture by an optical system consisting of lenses 22 and 23 and prisms 24 and 25. An image of the lamp filament is formed in or near the plane of the ribbons by a cone of light of such angular aperture that the diverging beam of light that has passed through the aperture more than fills the angle from *b* to *c*.

Thus when any one of the lenses 11 is in any position from *b* to *c*, a brightly illuminated image of the aperture of the light valve will be projected on the sensitive surface of the film.

FIG. 5 shows the film guide block 13 in a mid position such that the image formed by the lens 11 would fall in about the center of the film. Before starting to make a record, this guide 13 would naturally be moved down by backing away a lead screw 250 rotatable in a stationary nut 251 and coupled to guide 13 by a head portion 252 until the images of the light valve aperture are formed at the upper edge of the part of the film that is between the rows of perforations. Screw 250 is rotated in either direction by rotating gear 253 mounting the screw. Gear 253 may be visualized as being axially movable up and down by means of an elongated pinion in mesh with it. Arrangements of this kind are well known in the art. Then if the light valve is actuated in the usual way by audio frequency signals from a suitable electronic amplifier and if the turret 10 is rotated as shown at a suitable speed (which, in the situation as shown would be twenty revolutions per minute) and the lead screw is turned at the proper related speed by the interconnecting gear train, a negative record of the type shown above will be produced. Naturally the lamp current must be regulated to produce proper exposure of the film.

In the arrangement as shown, a corrective filter 30 is needed to give fully satisfactory results. Since the lenses 11 when in the side positions toward *b* and *c* receive light from the light valve aperture under a slightly oblique angle, the exposure of the film tends to be slightly less at or near the ends of the record lines than it is at the center. This can be compensated by giving the filter 30 a slight light absorption in its central parts while leaving it clear toward the ends.

In the construction shown, the filter 30 serves the further purpose of giving the graded cut off of the record lines at their ends, so as to give the overlap discussed above which is required in order to make continuous reproduction possible. In order to accomplish this, the filter 30 is made opaque at its ends, with the opacity grading over a short distance to complete transparency inside each end portion. Naturally the spacing of these graded portions must be correct with respect to the spacing of the lenses 11 and the distances of these lenses and of filter 30 from the light valve aperture. Some adjustment is possible for the purpose of obtaining a perfect overlap of the ends of the adjacent record lines by changing the distance of the filter 30 from the light valve.

In the example shown in FIGS. 4 and 5, the light modulating device is a light valve and there is only one rotating part—the turret or lens drum 10.

Figures 6, 6A, 7:
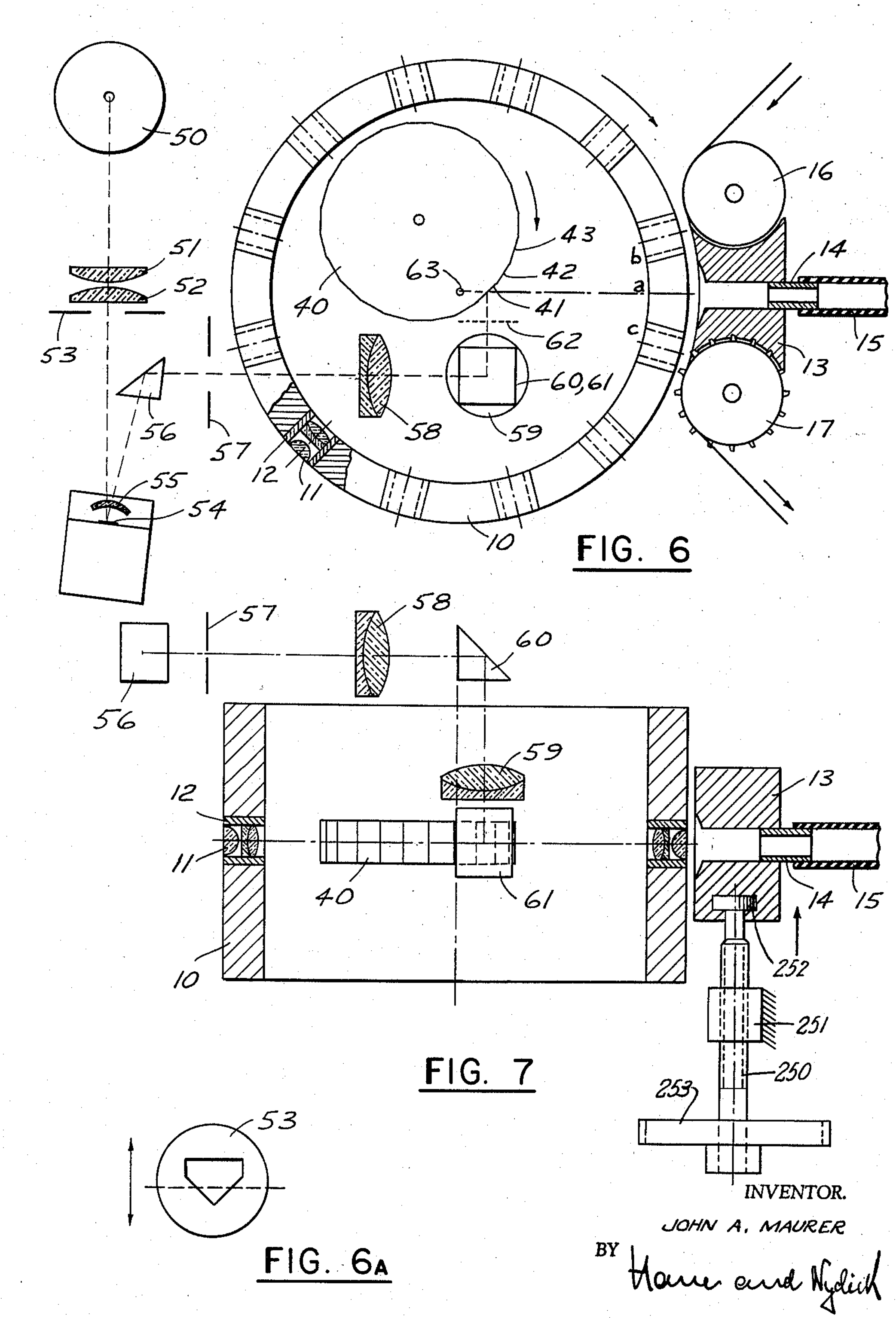
FIG. 6 shows a cross-sectional view of a modification of the apparatus according to the invention for recording the sound record lines of FIGS. 1, 2 and 3.
FIG. 6A is a detail view of one of the components of the apparatus of FIG. 6.
FIG. 7 is a side view, partly in section, of the apparatus according to FIG. 6.

FIGS. 6, 6A and 7 show a related type of system in which, for the sake of illustration, a mirror galvanometer and associated optical system are shown as the light modulating device. The system again comprises the turret 10, the lenses 11, the guide 13, the vacuum connections 14 and 15, the roller 16 and the feeding sprocket 17.

Within the turret 10, a polygonal mirror prism 40 rotates in the same direction as the turret 10, but at half the number of revolutions in any given time interval, that is, at half the angular velocity. This prism 40 has twice the number of plane mirror faces that the turret 10 has lenses in its periphery.

Light from the lamp 50 is directed through a pair of collective lenses 51 and 52 and through a mask 53 to the mirror of a galvanometer 54 which has in front of it a lens 55. The light is reflected by mirror 54 in such a direction as to enter totally reflecting prism 56. The lens 55 forms an image of the mask 53 which is in focus on a slit 57. When the galvanometer is excited by audio frequency currents from a suitable amplifier, the mirror 54 oscillates about an axis which is in the plane of the drawing, and the image of mask 53 moves across slit 57 in a direction at right angles to the length of the slit. Thus the length of slit 57 which is illuminated varies from instant to instant.

After passing through the slit, the light is transmitted through lenses 58 and 59 and prisms 60 and 61 and is directed toward a face 41 of the polygonal prism 40. The well corrected lenses 58 and 59 act to form a well defined image of slit 57 in the position of the dotted line marked 62. The two reflections at prisms 60 and 61 turn the image so that while the original slit 57 has its length horizontal the image at 62 has its length vertical.

The reflection of the light beam at face 41 of the mirror prism causes the light to proceed toward the point *a* as though it had come from the point 63, which is on the axis of rotation of the turret 10. As the turret 10 and the prism 40 turn in synchronism, with one face of the prism passing by the light beam each time that one of the lenses 11 passes from position *b* to position *c*, the reflection of the light from the prism faces causes the beam to follow the lenses 11, so that while the lenses 11 are passing in front of the film, each one will reimage the slit image at 62 as a very narrow bright line on the film.

When one of the vertices of the prism 40 passes through the light beam, the beam is divided, part of it being reflected to that one of lenses 11 which has been passing from *b* to *c* and part being reflected by the incoming prism face (for example, 42) to fall into the next lens in the sequence. When the junction (or vertex) of the two prism surfaces has passed entirely through the beam, the light is all reflected to the "next" lens. Thus the required gradual transition between the end of one line of the record and the beginning of the next line is made automatically by the action of the faces and vertices of the polygonal mirror prism 40.

FIGS. 8A and 8B show an exemplification of the class B type of recorder, using two light modulators simultaneously supplied with the same audio signal. In this case the light modulators are light valves mounted to rotate with the optical parts. The audio frequency signals are brought to them through slip-rings and brushes.

Two support members 110 and 111 are mounted coaxially in two supports 112 and 113 so as to be rotatable in these supports on thin walled ball bearings. The member 110 has a thin-walled cylindrical extension 114 which is adapted to support one edge of the film. The member 111 has also a thin walled extension 115 adapted to support the other edge of the film. On this extension are cut a set of sprocket teeth 116 which are adapted to mesh with the perforations in the corresponding edge of the film. The film comes to these parts from behind, at the top, and passes around the supports 114 and 115 so as to be convex toward the observer with the light sensitive surface inside. It is drawn away at the bottom, going away from the observer. The film is indicated in the drawing by two dotted lines labeled "film." The film is in contact with the supports 114 and 115 for somewhat more than 180 degrees of their circumferences; actually for about 210 degrees. It is held under tension by idler rollers in the film feeding system.

Being thus supported at its sides by cylindrical surfaces, and held under tension, the film, as is well known, lies very accurately in the form of a portion of a cylinder. For at least 190 degees of its wrap around the supports, this cylindrical form is maintained very accurately indeed.

Two gears 117 and 118 are carried by parts 110 and 111 respectively. By rotating gears 117 and 118 in synchronism, the supports 114 and 115 and the sprocket teeth 116 can be made to advance the film smoothly in the direction of its length by a suitable film advancing mechanism.

Inside the supports 114 and 115, but not touching them, is a tubular member 120 which is united by threaded portions with two more tubular members 121 and 122 which in turn are screwed into larger members 123 and 124. These end portions 123 and 124 are supported by thin wall ball bearings in two uprights 127 and 128 which are mounted on a carriage 129. The uprights 112 and 113 which carry the film-supporting parts (110—111—114—115) are mounted on a block 130 which is rigidly attached to the main bed plate of the machine 131. The carriage 129 moves in a straight line across 131 on steel balls 132. Its motion is constrained laterally by side walls on both sides of carriage 129 and two additional rows of steel balls.

The tubular members 120, 121, 122, 123 and 124 are accurately concentric and coaxial with the film support members 110, 111, 114 and 115, and remain so during the movement of carriage 129, which is parallel to the axis of the parts listed above. A series of slots 150, 151, 152 and 153 in the bottoms of the uprights 127, 112, 113, and 128 are made accurately parallel to the axes of the ball bearing seats in these uprights and are centrally loccated below them. A rectrangular steel guide bar (not shown) is used to align all these slots when the uprights are fastened to the block 130 and the carriage 129, the top surfaces of which have previously been made parts of one and the same plane surface. By this means, the axes of all the parts which carry the optical members and those which support the film in this machine are made to coincide with an accuracy of the order of .0001 inch.

Two light valves 140 and 141 are attached to tubular members 125 and 126 which slide inside the parts 123 and 124, providing thus for adjustment of the two light valves so that their ribbons are parallel and properly orientated with respect to the parts of the optical system that is to be described. The locations of the apertures between the ribbons in the two light valves are shown at 142 and 143.

Slip ring 144 and and brushes 145 provide for connecting the output of a suitable audio amplifier to the two light valves. The light valves may be operated either in series or in parallel. It is essential that the two light valves be identical in sensitivity and frequency response so that the light modulations they impart will be identical.

Two lamps 160 and 161 supply light for recording on the film in this machine. On the left side of the drawing, lamp 160 sends light through a condenser lens 162 mounted in light valve 140. This illuminates an achromatic, well corrected cylindrical lens 164 from which the light goes to prism 170. The light is reflected through a right angle at the hypotenuse surface of prism 170 and goes to a tiny cylindrical lens 166 which is very close to the film. The longer dimension of the aperture between the ribbons of light valve 140 is imaged on the film by lens 164. The shorter dimension (width) of this aperture is imaged on the sensitive surface of the film by the very tiny cylindrical lens 166. This latter image is less than .0001 inch in width. It is focused accurately on the film by a trial and error method by means of a suitable focusing mechanism.

The optical system on the right hand side of the drawing, including the parts 161, 163, 165, 171 and 176, is exactly like the one just described, except that after the reflection of the light at the hypotenuse face of prism 171 the light travels upward (in the drawing) and not downward.

The lenses 166 and 167 with their mounting and adjusting parts are made and located so that they are exactly 180 degrees apart with reference to the axis of rotation of the cylindrical member 120 in which they are supported. Likewise the cell in which prisms 170 and 171 are located is made very accurately concentric with the axis of member 120 and with its sides parallel to this axis. By this construction the paths of the two light beams from the lamps 160 and 161 after reflection from the hypotenuse faces of the prism 170 and 171 are very nearly parts of a straight line which intersects the main axis of the system at right angles at its center, and passes through the centers of the tiny lenses 166 and 167.

Gears 172 and 173, which are attached to the ends of the rotating system above described, are driven by gears 172*a* and 173*a*, which are on opposite ends of a shaft 174 which has bearings in the uprights 112, 113, 127 and 128. When the carriage 129 moves longitudinally as it does during the recording process, this shaft 174 slides lengthwise in its bearings in uprights 112 and 113.

Shaft 174 is driven from a synchronous motor (not shown) at such a rate that gears 172 and 173 are caused to rotate at a suitable speed, which, in the mechanism under discussion is 120 revolutions per minute. This is equivalent to one revolution in ½ second, during which time one section of sound track is recorded by each of the optical systems terminating in lenses 166 and 167.

Two shutters 175 and 176 are operated so as to admit light to each optical system while its final objective lens (166 or 167) is traveling downward on the side toward the observer from the top position in the drawing to the bottom position, and to cut off the light while the lens is traveling upward on the side away from the observer. The movement of these shutters may appropriately be controlled by cams connected with the train of gears which drives shaft 174 from the motor. In the situation shown in the drawing, the shutter 176 is moving upward to admit light to the system which ends in lens 167 while at the same time the shutter 175 is moving downward to cut off the light from the system which ends in the lens 166. The movement of shutters 175 and 176 is gradual, and gives the necessary overlap of the record lines at their ends.

It should be understood that when the system is viewed along the axis from the direction of lamp 160, the gear 172 and the entire system connected with it are seen to be rotating clockwise, during the recording operation, and at the same time the lead screw is moving the carriage 129 to the left. Recording starts at the right hand edge of the film just inside the sprocket holes, and ends at the left hand edge just inside the sprocket holes.

Turning now to FIGS. 9A, 9B, 9C, the same group of parts is provided in the central structure of these figures as is provided in FIGS. 8A and 8B and all numbers up to but not including 180 refer to the same parts in FIGS. 9A, 9B and 9C. To facilitate understanding of the location of the parts shown in FIGS. 9A and 9C and of the coaction of the parts shown in all three figures, FIG. 9B is repeated in fragmentary form between FIGS. 9A and 9C.

The light modulators in the embodiment of FIGS. 9A, 9B and 9C are mirror galvanometers, 180 and 181, which are used in such a way that they produce variable density sound track. This arrangement makes it possible to control the modulation by a mask of special shape so as to obtain a higher level of undistorted modulation in the final positive sound track than is possible with the light valve.

Referring to the optical system on the left side of the center of the drawing, there is shown a lamp 182 which sends its light by way of a condensing lens 184, a mask 186, and a first surface mirror 188 to the mirror of galvanometer 180. A lens 190 is mounted in front of the mirror so that the light passes through it twice. This lens 190 forms an image of mask 186 on a slit 192 which is mounted so that its length extends horizontally, or at right angles to the plane of the drawing.

A lens 194, mounted close to the slit 192, renders the light coming from the mirror of galvanometer 180 parallel. This light then passes through a Dove prism 196 to another lens 198, which renders the beam of light sufficiently convergent to enter the cylindrical lens 164.

By the combined action of lenses 194, 198 and 164, the galvanometer mirror is imaged through prism 170 and the small cylindrical lens 166 on the film. This imagery determines the length of the line of light which is formed on the sensitive surface of the film and therefore the width of the record line impressed on the film. In the direction at right angles to the one just mentioned, the small cylindrical lens 166 in combination with prism 170 and lenses 194 and 198 forms a greatly reduced image of the slit 192, thus giving a line of light less than .0001 inch wide on the film.

The optical system on the right hand side of the drawing, including lamp 183 and the parts 185, 187, 189, 181, 191, 193, 195, 197, 199, 165, 171 and 167 operates in an exactly similar manner.

Since slit 192 is horizontal, a rotation through ninety degrees is required in order to have the narrow line image formed by lens 166 lie parallel to the axis of rotation of the system, as it must in order to lie in a position at right angles to the record lines on the film. This ninety degree rotation is accomplished by the Dove prism 196 when it is in the position in which it is drawn.

Dove prism 196 (and its mate on the other end of the system, 197) serves a more general function in the system. Since the galvanometers 180 and 181 and the associated optical parts up to and including the slits 192 and 193 and lenses 194 and 195 are stationary while the lenses 198 and 199, 164 and 165, prisms 170 and 171, and small cylindrical lenses 166 and 167 rotate about the central axis of the machine, the angles between slit 192 and the axes of the cylindrical lenses by which it is imaged on the film are constantly changing. Dove prisms 196 and 197 are mounted in holders 200 and 201 respectively and these are mounted by means of thin walled ball bearings to rotate in supports 202 and 203. As is well known, rotation of a Dove prism about its longitudinal axis causes objects seen through it to appear to rotate about the projection of this longitudinal axis at twice the angular velocity at which the prism is rotated. In the present instance the longitudinal axes of the prisms coincide with the general rotational axis of the machine and the prism mountings are rotated by means of the gears 204 and 205 and 206 and 207 at one-half the speed at which the other parts of the system are rotated by the gears 172 and **172*a* and 173 and 173*a*. Thus the action of the Dove prisms is such that as seen through prism 196 the slit 192 stands in a constant angular relationship to the lenses 164 and 166 and as seen through prism 197 the slit 193 similarly stands in a constant angular relationship to lenses 165 and 167. In the assembly of the machine, these angular relationships are carefully adjusted so that as seen from lens 166, slit 192 always appears to be parallel to the cylinder axis of lens 166, and as seen from lens 167 slit 193 always appears to be parallel to the cylinder axis of lens 167**, and therefore both slits are imaged with maximum sharpness on the sensitive surface of the film as lines that lie transversely on the film, that is, at right angles to the direction of the recording motion and the scanning motion by which the record will be reproduced.

If the two Dove prisms rotating half as fast as the rest of the central optical system were not used, it would be necessary to have the two galvanometers 180 and 181 and all their associated parts including the lamps 182 and 183 mounted to rotate with parts 120, 121, 122, etc.

As in the previous example, the shaft 174 is rotated by a synchronous motor through appropriate reducing gears, so that the central part of the recording system rotates at a speed of 120 revolutions per minute, and at the same time the Dove prisms are rotated at a speed of 60 revolutions per minute. Shaft 174 also extends at both ends into the housings of galvanometers 180 and 181, where two gears 210 and 211 mesh with gears 212 and 213. The centers of these gears are cut out as shown in the sketch, and an internally extending shutter portion extends half way around this cut-out. These shutters as they rotate at 120 revolutions per minute come into position to intercept the light going from the mirrors of the galvanometers to the slits. The two shutters are adjusted so that when one is open the other is closed, and as one is closing the other is opening. These times of opening and closing are adjusted to occur just as lenses 166 and 167 reach the top and bottom positions in their rotation around the general rotational axis. Since it takes a little time for the edge of each shutter to pass through the light beam proceeding from the mirror of the adjacent galvanometer, the necessary overlap of the end of each record line with the beginning of the next line is automatically provided.

Those features of the construction which are closely similar to those discussed in connection with FIGS. 8A and 8B are not again discussed. The same considerations apply, particularly with reference to the need for extremely accurate concentricity of the rotating parts with the axis of the film supporting parts 114 and 115.

After a frame of record has been exposed, the film is advanced a distance of sixteen perforations to bring the next record area into place, and it is then necessary to bring the carriage 129 and all of the parts fastened to it back to the starting position at the right. This is accomplished by reversing the drive motor so that the lead screw motion is reversed and the carriage is therefore brought back to the right. In order that this may be done without fogging the film by the light coming through the optical system, two small shutters 214 and 215 are provided, mounted to be actuated by two small solenoids 216 and 217. When these solenoids are actuated, the light beams are cut off in both optical systems. This is accomplished automatically by means of an auxiliary contact on the switch which reverses the motor. The same purpose might be served by extinguishing the two lamps while returning the carriage, but in practice this would be undesirable because an appreciable period of time is required to stabilize the light of the lamp after they have been turned on, and this would slow down the operation of the machine. It is also true that when a lamp is turned on and off many time, its life is shorter than when it burns steadily for relatively long periods of time.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An apparatus for optically recording on a light sensitive area of a strip of film a sound record area in the form af an array of parallel continuous sound record lines, each extending substantially lengthwise of the film across the sound record area to be recorded, said apparatus comprising film support means for supporting said film area in a predetermined position during recording, light modulating means for modulating light in accordance with sound to be recorded, several movable optical means each receiving modulated light from said light modulating means and arranged to sweep a succession of parallel continuous line images corresponding to said modulated light across the surface of said film area substantially lengthwise of the strip of film, the length of each line image corresponding to the length of the sound record area, means for continually displacing the film and the sweep path of said line images in reference to each other at a right angle to the sweep motion whereby said array of parallel record lines is recorded on said film area, and light obturating means for gradually reducing the light value of each line of said parallel images near the end of its sweep path and gradually and correspondingly increasing the light value of each line image at the beginning of the sweep path of the next line image in said array.

2. An apparatus for optically recording on a light sensitive area of a strip of film a sound record area in the form of an array of continuous, parallel sound record lines of equal length and extending substantially lengthwise of the film, said apparatus comprising film support means for supporting said film area in a cylindrically curved position during the recording, light modulating means for modulating light in accordance with sound to be recorded, rotary optical means receiving modulated light from said light modulating means and arranged to sweep a succession of continuous, circumferentially equally spaced line images corresponding to said modulated light across said film area, the length of each line image corresponding to the length of the array on the film, said optical means including focusing means focusing said line images upon the surface of the film area and rotating about an axis coaxially with the geometric axis of said support means, means for continually displacing said optical means and said support means relative to each other in the direction of the axis of rotation of said optical means, said axis of displacement being at a right angle to the direction of said sweep motion whereby said array of parallel record lines is recorded on said film area, and light actuating means for gradually reducing the light value of each of said parallel line images near the end of its sweep path and gradually and correspondingly increasing the light value in each line image at the beginning of the sweep path of the next adjacent line image in said array.

3. An apparatus for recording on a light sensitive area of a strip of film a sound record area in the form of continuous, parallel sound record lines of equal length and extending substantially lengthwise of the film, said apparatus comprising film support means including cylindrically curved film guide means for supporting said film area in a cylindrically curved position during recording, light modulating means for modulating light in accordance with sound to be recorded, optical means including a rotary carrier rotatable about the geometric axis of said guide means, means for rotating said lens carrier, several lens means supported by said carrier at equal radial distance and at equal circumferential spacing, said light modulating means directing modulated light upon said lens means and said lens means being focused upon said film area, drive means for continually and linearly moving said lens carrier and said guide means relative to each other in the direction of said geometric axis, the rates of said rotary and linear motions being correlated to displace the lens carrier and the film guide relative to each other by a predetermined equal distance between the end of each sweep of a line image and the beginning of the next succeeding sweep of a line image, whereby a succession of parallel line images impinges upon said film area during rotation of said lens carrier, the length of each of said line images corresponding to the length of said array, and light obturating means for gradually reducing the light value of each line image near the end of its sweep path and gradually and correspondingly increasing the light value of each line image at the beginning of the sweep path of the next adjacent line image in said array.

4. An apparatus according to claim 3 wherein said light modulating means comprise light valve means.

5. An apparatus according to claim 3 wherein said light modulating means comprise mirror galvanometer means.

References Cited in the file of this patent

UNITED STATES PATENTS

| | | |
|---|---|---|
| 1,844,672 | Narath | Feb. 9, 1932 |
| 1,857,451 | Hansen | May 10, 1932 |
| 2,273,863 | Herzig | Feb. 24, 1942 |
| 2,369,572 | Hallmann | Feb. 13, 1945 |
| 2,510,121 | Lehmann | June 6, 1950 |
| 2,514,578 | Heller | July 11, 1950 |
| 2,830,131 | Jacobs | Apr. 8, 1958 |
| 2,885,490 | Pettus | May 5, 1959 |

FOREIGN PATENTS

| | | |
|---|---|---|
| 1,059,964 | France | Nov. 18, 1953 |